Patented Aug. 12, 1941

2,251,938

UNITED STATES PATENT OFFICE 2,251,938

PURIFICATION OF UNSATURATED COMPOUNDS

Claude W. Jordan, Paoli, Pa., assignor to The United Gas Improvement Company, a corporation of Pennsylvania No Drawing. Application February 10, 1938, Serial No. 189,765

8 Claims. (Cl. 260—674)

This invention pertains generally to the purification of resin-forming unsaturated hydrocarbons and pertains particularly to the purification of resin-forming unsaturated hydrocarbon distillates from gas condensates and tar oils produced in the manufacture of artificial gas. The invention pertains more particularly to the purification of crude resin-forming unsaturated hydrocarbons such as crude styrene and crude indene obtained during such distillation.

In the various processes for the manufacture of artificial gas quantities of tar are produced and the gas contains substantial quantities of condensible materials, the amounts of condensate and its composition depending upon the temperature to which the gas is reduced for condensation purposes.

The latter as well as the distillate from the tar are generally known as light oil and are sources for many saturated aromatic hydrocarbons such as benzene, toluene, xylene, naphthalene, etc., as well as sources for numerous unsaturated hydrocarbons of the aliphatic, the homocyclic and the heterocylic series.

For instance, light oil obtained under certain conditions of carburetted water gas manufacture contains, in addition to the aromatic hydrocarbons mentioned, substantial quantities of the resin-forming unsaturated hydrocarbons, namely, butadiene 1,3, isoprene, piperylene, cyclopentadiene, dicyclopentadiene, styrene, and indene.

With ordinary methods of fractional distillation as now practiced it is impossible to separate most of the resin-forming unsaturated hydrocarbons in a substantially pure state.

A typical styrene fraction, for instance, will contain hardly more than 50% styrene and typical indene fraction will contain hardly more than 80% indene.

Such fractions, as well as those of lower and higher concentration, are suitable for polymerization purposes in the manufacture of synthetic resins, except that the product is very often discolored, is of low melting point and perhaps unsatisfactory in some other quality traceable to impurities present.

I have discovered that the color forming constituents as well as other undesirable substances may be removed from resin-forming unsaturated light oil hydrocarbon fractions by selectively washing said fractions with a desired oxidizing reagent of more or less carefully controlled strength.

I prefer, for instance, to have the desired oxidizing reagent of sufficient strength to effectively remove color forming bodies without at the same time appreciably oxidizing, polymerizing or catalyzing reactions with, the desired resin-forming unsaturated hydrocarbon.

By way of example I have found, for instance, that when a petroleum residuum oil is used for carburetion, styrene and indene distillate fractions obtained as by-products in the manufacture of carburetted water gas may be effectively treated by washing for two successive ten minute periods with 5% by volume of an oxidizing reagent comprising 1200 parts by weight of concentrated (95%) sulfuric acid of specific gravity 1.84, 345 parts by weight of water and 5 parts by weight of potassium dichromate.

To illustrate a manner of contact a batch of distillate to be treated is placed in a suitable receptacle, the desired quantity, for instance, 5% by volume of the batch being treated, of a desired oxidizing reagent is added and the mixture is agitated for a suitable period such as ten minutes. A suitable settling period is then allowed such as thirty minutes whereupon the layers are separated by decantation or otherwise.

The distillate layer is then recontacted in the same manner with a fresh quantity of oxidizing reagent of similar volume. Upon settling the distillate layer is withdrawn, washed with alkali and/or water and if desired may be further purified by distillation such as with steam or under vacuum.

During the foregoing treatment the material has been observed to change from its original yellow to brown or bluish-green and upon washing with alkali to a golden yellow. Much of this color is removed by a water wash and any residual color may be removed by distillation to obtain a water white product.

A suitable solution for the alkali wash comprises a 20% solution of sodium hydroxide and a suitable quantity is 5% by volume, although any other suitable concentration and/or volume may be employed. Care should be exercised, however, in using more dilute alkali to avoid the formation of emulsions.

If desired, material under treatment may be contacted with the alkali solution in the same manner as with the acid and for the same period of time followed by settling and separation.

The material is then washed with water, say 20% by volume. Contact may take place in the same manner as before.

After separation of the layers the washed material may be subjected to distillation as a final purification step to remove from the desired resin-forming unsaturated hydrocarbon any residual color or any polymers or other materials which might have been formed during the treatment.

Contact between the material undergoing treatment and the desired oxidizing reagent, or alkali, or water may be accomplished by any other means known in the art. For instance, batch countercurrent contact or continuous countercurrent contact might be substituted. Reference is had particularly to the large number of processes and apparatus for leaching, generally, and for bringing mineral oil into contact with a chemical reagent, for the solvent extraction of mineral oils, etc. which may be adapted for use in carrying out this invention.

In removing the color forming substances from the various condensate fractions by means of the oxidizing mixtures described, reaction products such as alcohols, aldehydes, peroxides, ketones and acids may be formed.

I find it desirable to completely remove these reaction products to insure permanent decolorization and to prevent undesirable side reactions in the manufacture of synthetic resins such as from the styrene and indene fractions.

Most of these reaction products are removed by the treatment already described except that aldehydes may be found in appreciable amounts in the various fractions even after the prescribed treatment with alkali and water and distillation.

These may be completely removed by contacting the distillates with solutions of substances such as sodium hydrogen sulphite, ammonia, alkaline silver or copper solutions or solutions of other aldehyde reactive substances, which together with their reaction products are appreciably insoluble in hydrocarbons or are readily removed therefrom such as by solution in water, or preferably both. In the claims the term "aldehyde reactive substance" will be used in this sense.

Treatment with an aldehyde reactive substance is preferably followed by washing with water to remove traces of the reagent and its reaction products.

While as described treatment with an aldehyde reactive substance follows washing with alkali and water and distillation, it may, if desired, be applied at any other suitable point without departing from the invention.

Various other strengths of my desired oxidizing reagent may be employed depending upon the condition of the starting material and the degree of purification desired. The temperature at which the material is treated may also be varied to secure the most effective purification. In some cases cooling may be desirable and in others moderate heat may be imparted to the mixture.

I find, for instance, that when gas oil is used for carburetting instead of a heavy residuum, the oxidizing reagent may be of lower strength to accomplish the same degree of purification.

A typical oxidizing reagent in this case comprises 1100 parts by weight of concentrated (95%) sulfuric acid of specific gravity 1.84, 400 parts by weight of water and 5 parts by weight of potassium dichromate.

In addition to its function as an oxidizing reagent the mixture of sulfuric acid and dichromate appears to have other desirable purifying effects which is thought to be due more particularly to the action of the acid.

I find, for instance, that a fair amount of residue is left in the still upon distillation after washing which is indicative of the formation of high boiling materials during the process. Tests appear to substantiate the belief that these high boiling materials are formed chiefly at the expense of the impurities rather than the desired hydrocarbon, thus leaving the latter in a more highly purified state.

Resins resulting from the polymerization of the distillates treated by my process are characterized by the substantial or complete absence of color depending upon the intensity of the treatment.

Certain other oxidizing reagents might be used without departing from the broad concept of the invention. For instance, other acids might be substituted for sulfuric acid and other dichromate might be substituted for potassium dichromate.

Preferably, however, such substitutes are selected so as to have a minimum of undesirable side reactions such as addition to unsaturated double bonds of, or polymerization of, the desired resin-forming unsaturated hydrocarbon.

Among the substances which may be effectively used, are (1) a mixture of manganese dioxide and sulphuric acid; and (2) acidified permanganate solution.

Oxidizing reagents made with a dichromate, manganese dioxide, or potassium permanganate fall into the classification of oxidizing reagents having an ion in solution containing a metal and oxygen.

The following are some typical examples of the strengths of these solutions when employed. The composition may of course be varied to be most effective for treating the particular fraction under investigation.

1. Manganese dioxide-sulphuric acid mixture: 1200 parts by weight of concentrated sulphuric acid (sp. g. 1.84) 345 parts by weight of water, and 20 parts by weight of manganese dioxide.

2. Acidified permanganate: a 2% solution of potassium permanganate in dilute sulphuric acid.

Other substitutes will suggest themselves to persons skilled in the art upon becoming familiar with this invention.

As a general rule side reactions will increase with increase in concentration or proportion of the oxidizing reagents.

While the invention has been described more particularly in connection with the treatment of relatively crude styrene and indene, it will be seen that it may also be applied to more refined materials if desired for any reason.

It is to be understood that the above particular description is by way of illustration and that changes, omissions, additions, substitutions and/or modifications might be made within the scope of the claims without departing from the spirit of the invention which is intended to be limited only as required by the prior art.

I claim:

1. A process for the purification of crude styrene obtained from light oil comprising washing said styrene with a mixture of sulfuric acid and potassium dichromate under conditions insufficiently drastic to polymerize a substantial part of said styrene, then washing said styrene with an alkali followed by washing with water, distilling said styrene, treating said distillate to remove aldehydes, and finally washing said distillate with water.

2. A process for the purification of crude indene obtained from light oil comprising washing said indene with a mixture of sulfuric acid and potassium dichromate under conditions insufficiently drastic to polymerize a substantial part of said indene, then washing said indene with an alkali followed by washing with water, distilling said indene, treating said distillate to remove aldehydes, and finally washing said distillate with water.

3. A process for the purification of a particular resin-forming unsaturated light oil hydrocarbon, comprising treating said hydrocarbon with an acid having an ion in solution containing a metal and oxygen under conditions of reagent concentration and temperature sufficiently drastic to remove color forming bodies but insufficiently drastic to react a substantial part of said resin-forming unsaturated hydrocarbon, then separating the reagent from said hydrocarbon.

4. A process for the purification of a particular resin-forming unsaturated light oil hydrocarbon, comprising treating said hydrocarbon with a sulfuric acid reagent having an ion in solution containing a metal and oxygen under conditions of reagent concentration and temperature sufficiently drastic to remove color forming bodies but insufficiently drastic to react a substantial part of said resin-forming unsaturated hydrocarbon, then separating the reagent from said hydrocarbon.

5. A process for the purification of a particular resin-forming unsaturated light oil hydrocarbon, comprising treating said hydrocarbon with a mixture of sulfuric acid and potassium dichromate under conditions of reagent concentration and temperature sufficiently drastic to remove color forming bodies but insufficiently drastic to react a substantial part of said resin-forming unsaturated hydrocarbon, then separating the reagent from said hydrocarbon.

6. A process for preparing a refined solution of a particular resin-forming unsaturated light oil hydrocarbon which is highly resistant to color formation when subjected to conditions for the polymerization of said particular resin-forming unsaturated hydrocarbon which comprises subjecting light oil to fractional distillation to obtain a fraction concentrated in said particular resin-forming unsaturated hydrocarbon, treating said fraction with a mixture of sulfuric acid and potassium dichromate under conditions of reagent strength and temperature sufficiently drastic to remove color forming bodies but insufficiently drastic to react a substantial part of said resin-forming unsaturated hydrocarbon, and then removing the reagent from said fraction.

7. A process for preparing a refined light oil styrene fraction in which the styrene is highly resistant to discoloration when subjected to polymerization which comprises subjecting light oil to fractional distillation to obtain a relatively narrow styrene fraction, treating said fraction with a mixture of sulfuric acid and potassium dichromate under conditions sufficiently drastic to remove color forming bodies but insufficiently drastic to react a substantial part of said styrene, and then removing the reagent from said fraction.

8. A process for preparing a refined light oil indene fraction in which the indene is highly resistant to discoloration when subjected to polymerization which comprises subjecting light oil to fractional distillation to obtain a relatively narrow indene fraction, treating said fraction with a mixture of sulfuric acid and potassium dichromate under conditions sufficiently drastic to remove color forming bodies but insufficiently drastic to react a substantial part of said indene, and then removing the reagent from said fraction.

CLAUDE W. JORDAN.